March 5, 1940. L. ILLMER 2,192,443
BRAKE LEVER CLUTCH
Filed March 31, 1939
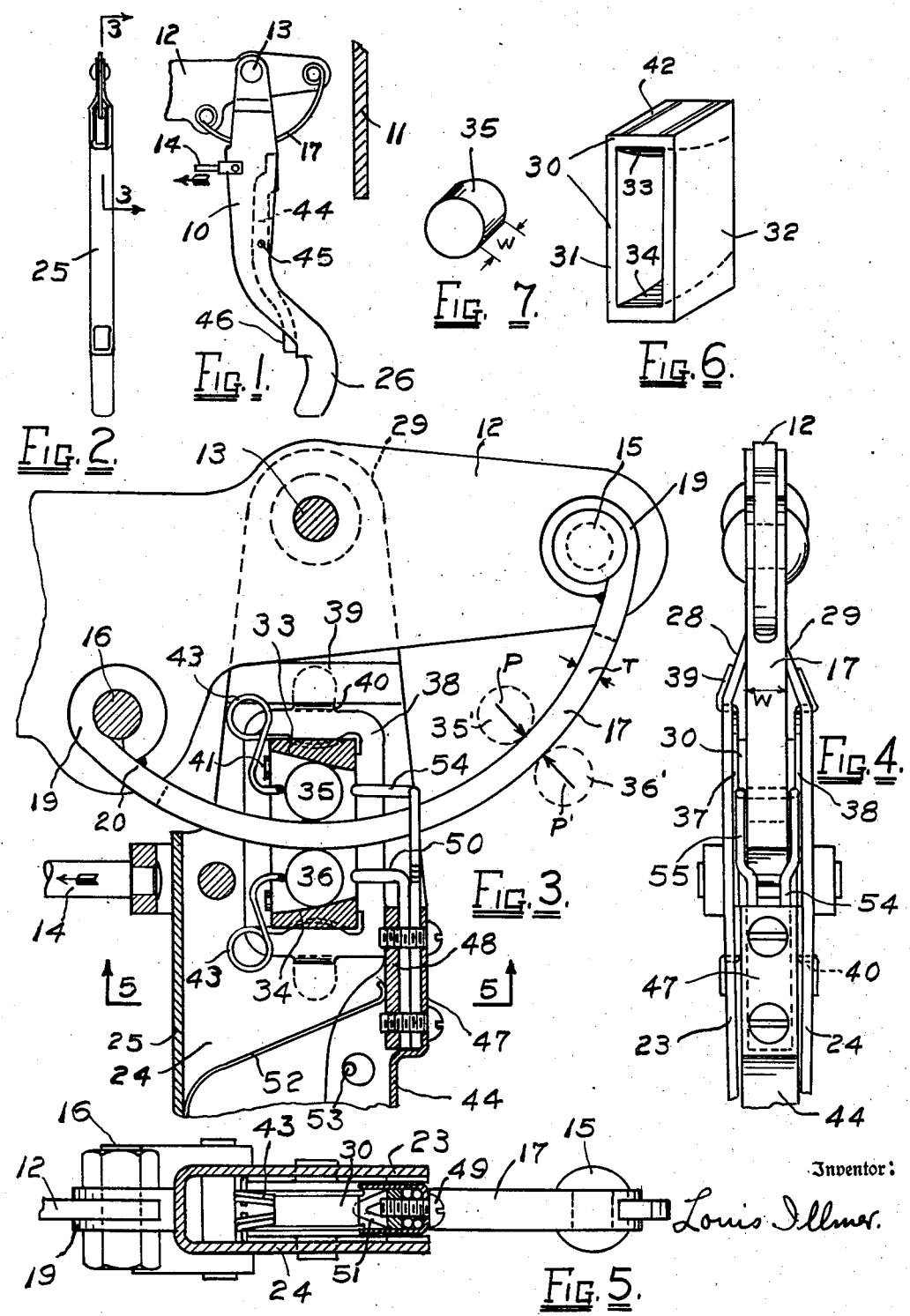
Inventor:
Louis Illmer.

Patented Mar. 5, 1940

2,192,443

UNITED STATES PATENT OFFICE 2,192,443

BRAKE LEVER CLUTCH

Louis Illmer, Cortland, N. Y.

Application March 31, 1939, Serial No. 265,250

10 Claims. (Cl. 74—531)

This invention broadly relates to a novel emergency lever assembly or other manipulative control adapted to releasably set up automotive vehicle brakes or the like, and is more particularly directed to improved lever retaining clutch devices of the heavy duty frictional type comprising twin cylindrical rollers that are compactly installed axially crosswise to the lever length within a unitary cavernous wedge housing, said double acting rollers being symmetrically arranged in counterbalanced thrust relationship upon opposite arcuate sides of an interposed thin sector strap. Such roller engaging strap sides may be upheld by a stationary bracket plate and concentrically disposed to lie at a different radial distance from a main fulcrum. A pivoted end region of a primary lever may be arranged to snugly swing about said fulcrum. My tubular roller housing may be rigidly mounted on such lever near the fulcrum axis and have the sector strap threaded therethrough, said housing being adapted to nest between mated flange confines of a stamped sheet metal lever shank.

Said housing may be interiorly equipped with opposed converging wedge faces and the respective rollers reversely interposed between a different wedge face and its arcuate strap side. The respective planes of my complementary wedge faces when projected toward the sector strap, intersect transversely with respect to the longitudinal lever axis. Retaining spring means independently urge the rollers toward their respective contracted ends of such inclined faces into an equalized initial frictional grip in the manner of one-way clutch means. A primary lever of this kind is capable of being operatively set into any swing position and may pivotally carry a trip lever serving to manually release the set rollers after having tensioned a cooperative brake actuating rod or cable.

While the roller type and also the tiltable washer type of lever clutch per se, are basically revealed in the prior art, their general commercial introduction has heretofore encountered some serious handicaps, particularly as regards lack of compact assembly and an assured adequate sector grip that shall possess a safety factor truly commensurate under all normal or adverse operating conditions with that afforded by a positive pawl and ratchet lever retainment.

In order that a stationary sector may be tightly gripped when strenuously setting up an applied brake lever, the wedge action of the clutch roller is required to exert a radial thrust of very high magnitude. Hence the rigidly mounted inclined faces cooperating therewith should be made from suitable hardened materials. When using a conventional single clutch roller that rides along the perimetric edge of a narrow stationary sector plate having a small radius, such lever clutch of itself affords an insufficient inherent drag or frictional grip to be fully commensurate with the holding power possessed by a conventional single toothed ratchet pawl.

A narrow perimetric plate edge when subjected to a single roller thrust under extreme loading, usually needs to be reenforced by a hardened wider inset whereby to resist rapid abrasion or scoring, all of which adds to fabrication expense. In addition, the unbalanced thrust set up by such single roller upon an inclined counter-wedging plane, reacts through the lever forks and must be taken up by the main fulcrum pin, which in turn further calls for an inherently heavy fulcrum mounting if rapid wear and fork distortion is to be suppressed.

A heavily loaded single roller clutch when radially located near the fulcrum axis as required in modern automotive practice, generally shows a tendency to slip back somewhat after the brake rod has been fully tensioned, although no such slip behavior may be experienced at a relatively lighter brake rod setting. The use of opposed rollers whose tangential line contacts are placed to efficiently supplement each other, materially extends the loading range in which initial slip back may be obviated. Twin rollers of the kind herein devised remain firmly engaged and are not likely to be inadvertently knocked loose nor accidentally disengaged by jarring except when deliberately released by a trip lever or the like remote control.

My improved assembly aims to eliminate the cited structural difficulties; first, by the use of a pair of directly opposed rollers confined within a rigid wedge housing of relatively small size through which the required heavy roller thrust may be properly counterbalanced in closed circuit fashion without allowing a reacting thrust to be imposed upon the main fulcrum. Furthermore, by compactly duplicating the cylindrical rollers in parallelism with the longitudinal axis of the lever fulcrum and placing their equalized drags in close adjacency, the factor of safety of a set brake lever may be intrinsically doubled against inadvertent slip back.

Both of my hardened twin rollers may be kept to a relatively small diametral size and axial length that fully satisfy automotive clutch needs capable of withstanding a predetermined maximum loading without substantial slip. Such rollers automatically roll into their respective inclined substantially plane faces and thrust themselves into tight wedging engagement with the interposed thin sector strap. The resulting radial roller thrust is thereby materially increased over that initially established by the retaining spring and which intensified thrust may under extreme frictional grip, exceed a half ton per roller.

As a further refinement, said axially parallel rollers, the hardened housing and inserted sector strap can all safely be held to a light weight so as to require the minimum of costly materials such as tempered tool steel or the equivalent nitrated stock, which correspondingly lowers the lever cost as a whole. This aspect assumes significance from a commercial standpoint in that a hand brake lever is required for each automotive vehicle built and because of their vast daily production, a corresponding considerable aggregate saving may be attained by such lowered factory cost.

The object of the present improvements is to contrive an inherently simple and reliable frictional lever clutch of the indicated character and that as applied to brake lever purposes shall be capable of being compactly incorporated into stamped automotive or the like sheet-metal brake lever shanks on a relatively low cost productive basis by the use of double grip rollers symmetrically assembled about the arcuate sides of a common sector strap in parallelism with the lever fulcrum axis.

Embodied herein are also associated structural aspects designed to facilitate the end in view and all of which features will hereinafter be pointed out in detail.

Reference is had to the accompanying one sheet of drawings which are illustrative of a preferred exemplification of my double roller clutch devices as applied to brake lever needs, and in which:

Fig. 1 schematically shows an elevational side view of a depending suspended type of brake lever equipped with my frictional detent means, while Fig. 2 is a vertical edge view thereof.

Fig. 3 fragmentally depicts in enlarged scale, a cross-sectional detail taken along line 3—3 of Fig. 2.

Fig. 4 presents an enlarged edge view of Fig. 3 and Fig. 5 is a transverse detail taken along line 5—5 of Fig. 3.

Fig. 6 shows a perspective view of my roller wedge housing and Fig. 7 one of the plain rollers cooperating therewith.

Referring more specifically to these disclosures, a primary brake lever 10 of the depending type is shown pivotally suspended behind the instrument board 11 by a stationary bracket plate 12 of unhardened steel to swing on the main pivot 13 toward the seated driver when applying tension to the operatively connected draft rod or cable 14.

The comparatively thin plate 12 may be provided with spaced apertures through which a headed rivet 15 and a detachable bolt 16 may respectively be dowelled. A narrow, relatively thin sector strap 17 of hardened tool steel stock having a radial thickness T, is preferably given an arc shape to comprise opposed arcuate sides having different radii whose center of curvature lies coincident with the fulcrum axis. Each longitudinally slotted sector end may be bent into a bifurcated eye 19 that is closed at 20 by welding. The strap width W may be made approximately twice the thickness of the bracket plate with the eyes disposed in straddling relation thereto. As shown, one such bifurcated eye is laterally retained by the rivet 15; by removing the through bolt 16, the arcuate sector may be swung around the rivet axis. Essentially only one strap end needs to be upheld by the bracket plate.

The primary lever 10 may be fabricated from ordinary sheet metal to include a cross-sectionally channeled shank portion having laterally spaced flanges 23 and 24 integrally interconnected by a longitudinal web 25. Said shank may be given a crooked shape to clear the instrument board and of which lever, one end may terminate in a perimetrically closed pistol type of handle 26. The other lever end may terminate in laterally spaced forks 28 and 29 of which the tips may be inset to pivotally bear against opposite side faces of the bracket plate 12.

A unitary cavernous roller housing 30 (see Fig. 6) may be drop forged or otherwise shaped from tool steel or the like high grade material into a hollowed rectangular contour to comprise spaced flat web members 31 and 32. The corresponding ends thereof may be integrally connected by opposed bridge components, respectively provided with a hardened interior wedge face 33 or 34 that are herein kept substantially plane and inclined in converging relationship. These inclined jaw faces respectively contact their rollers along the rectilinear length marked W in Fig. 7. Such transverse faces may respectively be slightly warped to reversely conform in contour with their cooperating strap sides and maintain an effective acute wedge angle therebetween of approximately 12°. My flat sector strap is intended to be entered centrally through said housing (see Fig. 3) and have a hardened plain cylindrical roller such as 35 or 36 interposed between each wedge face and its next adjacent strap side, as shown. These independently rotatable rollers are preferably of the flat ended type without need of trunnions and lie in parallelism with the fulcrum axis. If desired, said housing may likewise be given a cross-sectionally channelled shape provided with a single heavy web.

The separate housing 30 may be fixedly mounted between the lever side flanges in any suitable manner. An appropriate fastening consists in circumscribing retaining frames of sheet metal 37 and 38 of which the inner rectangular margin snugly conforms to the shape of the roller housing perimeter. Each frame may be stamped to provide a pair of mated marginal prongs such as 39 which are snugly cleated through registering slots 40 pierced in a lever flange. The respective frames may be equipped with upstanding inner abutments 41 respectively serving to retain the rollers within the housing confines. It will be apparent that my roller housing means may also be secured exteriorly of a solid lever shank.

Each transverse housing bridge may be provided with parallelly milled grooves 42 into which to affix the respective end regions of a coiled tension spring 43. Independent self-clutching springs are utilized to lightly urge my twin rollers toward the converging region of their respective wedge faces 33 and 34 whereby the clutch rollers may instantly grip the interposed sector strap when the brake rod 14 is set up to initiate a pull in the arrowed direction.

It will be apparent that my one-way roller clutch permits the applied lever to be freely shifted in ratchet fashion in a direction contrary to said arrow so as to releasably shift the rollers toward the seated driver while approaching their respective fully set brake positions designated 35' and 36'. When frictionally locked, such cylindrical detents roll into tight self-wedging engagement and exert the aligned heavy grip thrusts P and P' directed inwardly toward the opposed side faces of the strap 17. Said thrusts are kept fully counterbalanced through the housing side members 31 and 32 without being transmitted through the lever forks or allowed to load the main fulcrum 13. Accordingly, a lighter construction of these vital lever parts is permitted.

In the present embodiment such localized thrust loading is purposely confined to the rollers, the sector strap and the mounting housing, all of which elements are preferably fabricated from inherently strong, hardened materials capable of withstanding extreme roller pressure without rapid abrasive wear or excessive distortion. The fact that the reversed roller thrusts herein act in direct opposition, does not subject the interposed sector strap to a heavy cocking moment in tiltable washer fashion, nor does my self-contained roller housing 30 need to be tiltably pivoted to the primary lever.

The load carrying capacity of a roller is proportionate to its effective length W which is herein materially increased over the spacing between the sides of the bracket plate 12. In addition, the thickness T of the sector strap 17 may safely be held to a dimension considerably smaller than its width W which imparts a corresponding lateral yield thereto capable of substantially equalizing opposed roller thrusts under extreme loading and of correcting for misalignment or the like structural variations.

The rollers may be manually released by any suitable means. For a suspended automotive lever, it is preferred to resort to a sheet metal trip lever 44 that may be pivoted intermediate its ends to the primary lever as at 45 with a depending trigger latch 46 carried into a cooperative relation to the pistol grip 26 as indicated in Fig. 1. The other end of said cross-sectionally channelled trip lever contiguous to the sector strap, may terminate in a pocket 47 shaped to have a clamping plate 48 inset therein. This plate may be drawn in place by plural screws such as 49.

A short forked prop 50 of heavy wire or equivalent means may include tines firmly clamped by said plate. The prop yoke may be bent perpendicularly into a nose shaped head 51 that is directed toward the axis of the roller 35 but is initially held spaced therefrom by the stop pin 53 and the return spring 52. A companion longer forked prop 54 may be similarly shaped with its tines superimposed upon those of the shorter prop and demountably clamped beneath the common plate 48 in the Fig. 5 manner. Both prop heads may be kept alike except that the longer prop 54 constitutes a looped trip lever end whose tines are respectively spread outward at 55 to clear and permit the encircled sector strap to freely slip therethrough. As arranged, both set rollers may readily be released by actuating the latch trigger 46 which then brings the prop into abutment with the respective rollers to shift them out of rod gripping engagement against the low tensioned retaining springs 43. In order to ease such release, the handle of a set primary lever may be drawn up somewhat toward the driver prior to manipulating the trip lever. It is emphasized that all my clutch parts may be neatly and compactly nested within the narrow confines of the lever flanges 23 and 24.

It is believed that the intended mode of lever operation will be readily understood without explicit functional definition. The brake lever is manually applied in ratchet fashion by the pistol grip 26 against the opposition of the draft rod 14 without actuating the inset finger trigger 46, the latter being manipulated when the set brake lever is to be released.

My adequate sector grip eliminates the need for stepwise ratchet setting of a conventional pawl whose toe or cooperating teeth after protracted use under repeated extreme loading, tend to wear into a defective rounded condition and thereby lose a substantial portion of initial retaining power. The substitution of twin rollers also affords a fully sustained safety factor in which any gradual wear of all clutch parts is self compensating by virtue of having the rollers enter further into their converging inclined faces 33 and 34. Furthermore, the provision for the cited liberal frictional grip renders my lever clutch serviceable although its twin roller drags may inadvertently become impaired by liquid wetting or similar contingencies likely to reduce such grip relative to its dry state.

As will be understood by those skilled in this art, my improvements also find application to other than emergency brake lever uses and that various changes in the structural details and disposition thereof may be resorted to in carrying out the illustrative embodiment of my lever clutch devices, all without departing from the spirit and scope of my invention heretofore described and more particularly pointed out in the appended claims.

I claim:

1. In a lever retaining clutch assembly of the one-way frictional type, a main fulcrum, a shiftable primary lever pivoted upon said fulcrum, draft rod means actuated in unison with an applied lever shift, a sector strap provided with radially spaced arcuate sides upheld about the fulcrum axis, cavernous roller housing means affixed to said lever and having the sector strap slidably entered therethrough, said housing means including a pair of rigidly interconnected opposed wedge faces that are substantially plane and relatively inclined to converge toward the strap and which face planes intersect transversely with respect to the longitudinal lever axis, a separate independently rotatable cylindrical roller releasably interposed between each strap side and its next adjacent wedge face, said rollers when released each being freely retractible radially from their respective strap sides, and resilient means normally urging both rollers toward said convergently inclined region into initial operative line contact with their respective wedge faces under substantially equal thrust and into additive self-clutching grip with a different strap side, the respective initial roller grips being automatically intensified by the cooperating wedge faces in a proportionate relation to the opposition imposed upon the applied lever by said draft rod means.

2. In a lever retaining clutch assembly of the one-way frictional type, a stationary bracket plate mounting a main fulcrum thereon, a shiftable primary lever pivoted upon said fulcrum, draft rod means operatively tensioned by the applied lever, a sector strap provided with radially spaced arcuate sides that are concentrically disposed about the fulcrum axis and upheld by said plate, the radial thickness of said strap being smaller in size than the side width thereof, cavernous metallic roller housing means affixed to a lever shank portion and having the sector strap slidably entered therethrough, said housing means including a pair of opposed web interconnected wedge faces that are substantially plane and relatively inclined to converge toward the strap and which face planes intersect transversely with respect to the longitudinal lever axis, a separate flat ended roller operatively interposed between each strap side and its next adjacent wedge face to respectively roll in axial parallelism with the fulcrum and frictionally grip said strap therebetween, resilient means normally urging both rollers toward said convergently inclined region into operative line contact with their respective wedge faces and into additive self-clutching engagement with a different strap side, the resulting initial roller thrusts toward said strap both being automatically intensified by said wedge faces in a proportionate relation to the applied draft rod tension and the respective rollers being alignedly arranged to tangentially contact the interposed strap in balanced registry without exerting a substantial cocking moment thereon, and common releasing means for manually actuating both engaged rollers counterwise to the urge of the resilient means.

3. In lever retaining means of the one-way frictional clutch type, a stationary bracket plate mounting a main fulcrum thereon, a sheet metal primary lever comprising laterally spaced flanges of which corresponding end regions are pivoted upon said fulcrum, draft rod means operatively tensioned by the applied lever, a metallic sector strap provided with mated sides disposed about the fulcrum axis and upheld by said plate, cavernous metallic roller housing means affixedly nested between the pivoted end region of the lever flanges and having the sector strap slidably entered therethrough, said housing means including a pair of opposed cooperative wedge faces that are substantially plane and relatively inclined to converge toward the strap, a separate independently rotatable cylindrical roller interposed between each strap side and its next adjacent wedge face, and resilient means normally urging both rollers toward said convergently inclined region into operative line contact with their respective wedge faces and into additive initial self-clutching engagement with a different strap side, the resulting initial roller thrusts being counterbalanced by said housing means and automatically intensified by the respective wedge faces in a proportionate relation to the applied draft rod tension, said housing means, rollers and resilient means being incorporated within the width confines of the spaced lever flanges.

4. In brake lever retaining means of the one-way frictional clutch type, a stationary bracket plate mounting a main fulcrum thereon, a sheet metal primary lever comprising laterally spaced flanges of which corresponding end regions are pivoted upon the fulcrum, brake rod means operatively tensioned by the applied lever, a metallic sector strap provided with mated sides disposed about the fulcrum axis and upheld by said plate, an endless metallic roller housing disposed to bridge the pivoted end region of the lever flanges and having the sector strap slidably entered through the housing, said housing comprising a pair of cooperating opposed wedge faces that are relatively inclined toward the strap, a retaining frame encircling the housing perimeter and affixed to a housing flange, and a separate freely rotatable roller interposed between each strap side and its next adjacent wedge face to respectively roll lengthwise of and frictionally grip said strap therebetween in additive self-clutching fashion when the lever is shifted in one direction, the resulting initial roller thrusts toward said strap both being automatically intensified in a proportionate relation to the applied draft rod tension and substantially counterbalanced by said housing.

5. In a lever retaining clutch assembly of the one-way frictional type, a stationary bracket plate having a certain thickness and mounting a main fulcrum thereon, a shiftable primary lever pivoted upon said fulcrum, draft rod means actuated in unison with an applied lever shift, a sector strap provided with radially spaced arcuate sides that are concentrically disposed about the fulcrum axis and having a side width that is kept materially wider than the aforesaid plate thickness, one end of said strap being provided with a longitudinally bifurcated eye disposed in a straddling relation to said plate, dowel means entered through said eye and the plate serving to uphold the sector strap, cavernous metallic roller housing means affixed to a lever shank portion and having the sector strap slidably entered therethrough, said housing means including a pair of opposed cooperating wedge faces that are relatively inclined to converge toward the strap in a transversely intersecting relation with respect to the longitudinal lever axis, a separate independently rotatable cylindrical roller interposed between each trap side and its next adjacent wedge face to roll lengthwise of and frictionally grip said strap therebetween in additive self-clutching fashion when the lever is shifted in one direction, the resulting initial roller thrusts toward said strap both being automatically intensified by the respective wedge faces in a proportionate relation to the applied draft rod effort and which intensified thrust is substantially counterbalanced by said housing means.

6. In a lever retaining clutch assembly of the one-way frictional type, a stationary bracket plate mounting a main fulcrum thereon, a shiftable primary lever pivoted upon said fulcrum, draft rod means operatively actuated in unison with an applied lever shift, a sector strap of hardened steel stock providing for mated initially flat sides that are concentrically shaped about the fulcrum axis in radially spaced relation and upheld by said plate, the radial thickness of said strap being kept sufficiently thin to impart pronounced lateral yield thereto when subjected to the hereafter stipulated intensified roller thrust, cavernous metallic roller housing means affixed to a lever shank portion and having the sector strap slidably entered therethrough, said housing means including a pair of opposed cooperative wedge faces that are relatively inclined to converge toward the strap and which faces when projected intersect in a transverse relation to the longitudinal lever axis, a separate independently rotatable roller interposed between each strap side and its next adjacent wedge face to roll lengthwise of and in unison frictionally grip said strap therebetween when the lever is shifted in one direction, resilient means normally urging both rollers toward the aforesaid convergently inclined region into operative initial contact with their respective wedge faces and into additive self-clutching engagement with a different strap side, the resulting initial roller thrusts toward said strap both being automatically intensified by the respective wedge faces in a proportionate relation to the applied draft rod effort and substantially equalized by lateral yield on part of the interposed sector strap, and common releasing means for manually actuating the engaged rollers lengthwise of said strap in a direction counterwise to said convergently inclined region.

7. In a lever retaining clutch assembly of the one-way frictional type, a stationary main fulcrum, a shiftable primary lever pivoted upon said fulcrum, draft rod means actuated in unison with an applied lever shift, sector strap means provided with mated sides, a cavernous metallic roller housing of elongated polygonal perimeter affixed lengthwise to said lever and having the sector strap means slidably entered therethrough, said housing including a pair of opposed cooperating wedge faces that are substantially plane and relatively inclined to converge toward the strap and which planes when projected intersect in parallelism with the fulcrum axis, a separate freely rotatable cylindrical roller interposed between each strap side and its next adjacent wedge face to roll lengthwise of and frictionally grip said strap therebetween when the lever is shifted in one direction, and resilient means mounted exteriorly upon the housing and extending inwardly from its perimeter to urge the respective rollers toward said convergently inclined region into operative line contact with their wedge faces and into additive self-clutching engagement with a different strap side, the respective initial roller thrusts toward said strap both being automatically intensified by the respective wedge faces in a proportionate relation to the opposition imposed upon the applied lever by the draft rod means.

8. In a lever retaining clutch assembly of the one-way frictional type, a main fulcrum, a shiftable primary lever pivoted upon said fulcrum, draft rod means actuated in unison with an applied lever shift, a sector strap provided with radially spaced arcuate sides that are concentrically upheld about the fulcrum axis, cavernous roller housing means affixed to said lever and having the sector strap slidably entered therethrough, said housing means including a pair of superficially warped concave and convex wedge faces that are relatively inclined in the same general direction to converge toward the interposed strap and provide for a substantially uniform wedge angle relative to each arcuate strap side, a separate freely rotatable cylindrical roller interposed between each strap side and its next adjacent wedge face to frictionally grip said strap therebetween when the lever is shifted in one direction, and resilient means initially urging both rollers toward said convergingly inclined region of their respective wedge faces into additive self-clutching engagement with a different strap side, the respective initial roller thrusts toward said strap both being automatically intensified by the respective wedge faces in a proportionate relation to the opposition imposed upon the applied lever by the draft rod.

9. In a lever retaining clutch assembly of the one-way frictional type, a stationary main fulcrum, a shiftable sheet metal primary lever comprising laterally spaced flanges of which corresponding end regions are pivoted upon said fulcrum, draft rod means operatively tensioned by the applied lever, a metallic sector strap provided with radially spaced arcuate sides that are concentrically upheld about the fulcrum axis, cavernous roller housing means affixed to bridge the pivoted end region of the lever flanges and having the sector strap slidably associated therewith, said housing means including a pair of opposed cooperating wedge faces that are substantially plane and relatively inclined to converge toward the strap and which face planes when projected intersect transversely with respect to the longitudinal lever axis, a separate independently rotatable cylindrical roller interposed between each strap side and its next adjacent wedge face to respectively roll lengthwise of and frictionally grip said strap therebetween when the lever is shifted in one direction, resilient means normally urging both rollers toward said convergently inclined region into initial operative line contact with their respective wedge faces and into additive self-clutching engagement with a different strap side, the resulting initial roller thrusts being counterbalanced by said housing means and automatically intensified by the respective wedge faces in a proportionate relation to the opposed draft rod tension, and spring returned manipulative lever means pivoted to the primary lever and serving to release said counterbalanced roller thrusts, one manipulative lever end being looped around the sector strap and normally kept disengaged from the respective rollers prior to the release thereof.

10. In a lever retaining clutch assembly of the double acting frictional type, a fixed main fulcrum, a shiftable primary lever mounted upon said fulcrum, draft rod means cooperatively actuated by the applied lever, a sector strap provided with radially spaced arcuate sides that are concentrically upheld about the fulcrum axis, cavernous roller housing means affixed to said lever and having the sector strap slidably associated therewith, said housing means including a pair of rigidly interconnected wedge faces that are substantially plane and relatively inclined to converge toward the strap and which face planes when projected intersect transversely with respect to the longitudinal lever axis, a separate independently rotatable cylindrical roller interposed between each strap side and its next adjacent wedge face to respectively roll lengthwise of and frictionally grip said strap therebetween, resilient means normally urging both rollers toward said convergently inclined region into initial operative line contact with their respective wedge faces and into self-clutching engagement with a different strap side, the resulting initial roller thrusts being counter-balanced by said housing means and automatically intensified by the respective wedge faces in a proportionate relation to the opposition imposed upon the applied lever by the draft rod means, and manipulative lever means pivoted to the primary lever in alongside relationship, one end of the manipulative lever being provided with demountable forked prop means arranged to freely straddle said strap and angularly extend beyond said end to manually release an engaged roller in a direction counterwise to the urge of the resilient means, said prop means being normally disconnected from the last named roller prior to the release thereof.

LOUIS ILLMER.